United States Patent [19]

Mishra et al.

[11] Patent Number: 4,943,616
[45] Date of Patent: Jul. 24, 1990

[54] LIVING CATIONIC POLYMERIZATION PROCESS

[75] Inventors: Munmaya K. Mishra, Hudson, Ohio; Akhtar Osman, Clearwater, Canada

[73] Assignee: Polysar Limited, Sarnia, Canada

[21] Appl. No.: 445,170

[22] Filed: Dec. 4, 1989

Related U.S. Application Data

[63] Continuation of Ser. No. 333,024, Apr. 4, 1989, abandoned, which is a continuation-in-part of Ser. No. 224,370, Jul. 26, 1988, Pat. No. 4,908,421.

[51] Int. Cl.$^5$ .................... C08F 4/14; C08F 4/34; C08F 10/10
[52] U.S. Cl. .................... 525/264; 525/245; 525/251; 525/256; 525/260; 525/263; 525/314; 525/316; 525/918; 526/79; 526/135; 526/146; 526/147; 526/192; 526/204; 526/219; 526/221; 526/227; 526/230; 526/230.5; 526/232; 536/237; 536/339; 536/347; 536/348.7; 536/232.3
[58] Field of Search ............... 525/264, 245, 251, 256, 525/260, 314, 316; 526/79, 146, 147, 192, 204, 219, 227, 230, 230.5, 232, 237

[56] References Cited

U.S. PATENT DOCUMENTS

| | | |
|---|---|---|
| 3,629,215 | 12/1971 | Nakaguchi et al. ............. 526/227 X |
| 3,959,225 | 5/1976 | Kuntz ............................. 526/237 X |
| 4,276,394 | 6/1981 | Kennedy et al. ............. 526/348.7 X |
| 4,316,973 | 2/1982 | Kennedy ....................... 526/348.7 X |
| 4,342,849 | 8/1982 | Kennedy ....................... 526/348.7 X |
| 4,524,188 | 6/1985 | Kennedy et al. ............. 526/348.7 X |

FOREIGN PATENT DOCUMENTS 0206756 12/1986 European Pat. Off. ............ 526/237

OTHER PUBLICATIONS

Gabor Kaszas et al., "Electron Pair Donors in Carbocationic Polymerization" Polymer Bulletin 20, 413-419 (1988).

Primary Examiner—Joseph L. Schofer
Assistant Examiner—F. M. Teskin
Attorney, Agent, or Firm—Stevens, Davis, Miller & Mosher

[57] ABSTRACT

A polymerization process is provided for producing a terminally functional polymer which comprises introducing a monomer charge, a Lewis acid and an organic peroxy compound into a suitable reaction vessel and polymerizing the monomer charge at a temperature of from about 0° to about −80° C. to form the terminally functional polymer, wherein the monomer charge comprises isobutylene and the organic peroxy compound is charged in an amount of from about $10^{-4}$ to about $10^{-1}$ moles per mole of the isobutylene. In a preferred embodiment, the monomer charge additionally comprises vinylidene aromatic or diolefin monomers. In another preferred embodiment the monomer charge comprises the sequential addition of isobutylene and vinylidene aromatic or diolefin monomers. In a further preferred embodiment said reaction vessel is additionally charged with an electron door having an electron door number of from about 22 to about 50 the amount of said electron door being from about $10^{-4}$ to about $10^{-1}$ moles of said isobutylene. The invention also provides a novel catalyst system comprising an organic peroxy compund and a Lewis acid for the polymerization of isobutylene or monomer mixtures containing isobutylene.

37 Claims, No Drawings

LIVING CATIONIC POLYMERIZATION PROCESS

This application is a continuation of application Ser. No. 333,024, filed Apr. 4, 1989, now abandoned, which is a continuation-in-part of U.S. Ser. No. 224,370, filed July 26, 1988, now U.S. Pat. No. 4,908,421.

FIELD OF THE INVENTION

The present invention relates to a polymerization process for producing a terminally functional polymer. Further, the present invention relates to a novel catalyst system for the polymerization of isobutylene or a mixture of monomers containing isobutylene.

BACKGROUND OF THE INVENTION

Terminally functional polymers are of great interest in that they may serve as precursors to the production of graft or block copolymers. Graft or block copolymers are of interest because they represent a way in which two different and incompatible polymers' segments may be compatibilized. Thus, it would be advantageous to develop a process whereby a terminally functional polymer may be simply produced.

DESCRIPTION OF THE PRIOR ART

Kennedy has developed a series of initiator-transfer agents, "inifers", to be used as initiators for the synthesis of terminally functional, "telechelic", polymers of isobutylene. The "inifer" is capable of (i) participating in initiation during the polymerization reaction, and (ii) participating in the process of chain transfer to the "inifer". Thus, the "inifer" when used in conjunction with a Lewis acid can be used to conduct carbocationic polymerization of isobutylene to produce a terminally functional polymer. Kennedy's preferred group of "inifer" appears to be $AY_n$, wherein: A is an aryl moiety, Y is —$C(CH_3)_2Cl$ and n is an integer of from 1 to 4. The "telechelic" polymers produced by using the "inifer" retain the group A terminally (in the case of n=1) or within the polymer backbone (in the case of n=2, 3 or 4) and the tertiary chlorine group terminally. For a more detailed discussion of these "inifers", see U.S Pat. Nos. 4,276,394 and 4,524,188.

The tertiary chlorine ended "telechelic" polymers described above may be used as precursors for the synthesis of a variety of functionalities at the polymer termini. For a more detailed discussion of these polymers and their production, see U.S. Pat. Nos. 4,316,973 and 4,342,849.

Kennedy further discloses in published European Patent Application 206,756 that a "living" catalyst system comprising an organic acid for its ester) and Lewis acid may suitably be used to produce a polymer of isobutylene (or a copolymer of isobutylene and isoprene) having functional end groups.

In Polymer Bulletin 20, pages 413–319 (1988) Kennedy et al. also disclose that the use of certain types of electron pair donors with a "living" catalyst system enables a polyisobutylene with a well-defined narrow molecular weight distribution to be synthesized.

SUMMARY OF THE INVENTION

It is an objective of the present invention to provide a process for producing a terminally functional polymer.

It is another objective of the present invention to provide a novel catalyst system for use in producing a terminally functional polymer.

Accordingly, in one of its aspects, the present invention provides a living cationic polymerization process for producing a terminally functional polymer which comprises introducing a monomer charge, a Lewis acid and an organic peroxy compound into a suitable reaction vessel and polymerizing the monomer charge at a temperature of from about 0° to about −80° C. to form the terminally functional polymer, wherein the monomer charge comprises isobutylene and the organic peroxy compound is charged in an amount of from about $10^{-4}$ to about $10^{-1}$ moles per mole of the isobutylene.

Further, in another of its aspects, the present invention provides a catalyst system suitable for use in living cationic polymerization which comprises an organic peroxy compound and a Lewis acid.

DETAILED DESCRIPTION OF THE INVENTION

The present invention provides a process for the production of a terminally functional polymer. In developing this process we have discovered a novel catalyst system which can be used to conduct living polymerization. The term "living polymerization" as used herein is defined as a polymerization which is theoretically terminationless and is not susceptible to chain transfer.

Specifically, we provide a catalyst system which comprises (i) a Lewis acid and (ii) an organic peroxy compound.

A number of Lewis acids are suitable for use in the process disclosed herein. Non-limiting examples include $BCl_3$, $BF_3$, $AlCl_3$, $SnCl_4$, $TiCl_4$, $SbF_5$, $SeCl_3$, $ZnCl_2$, $FeCl_3$ and $VCl_4$. The preferred Lewis acids for use in the present invention are $BCl_3$ and $TiCl_4$.

Generally, the organic peroxy compound suitable for use in the process disclosed herein may be selected from the group comprising organic peroxides and hydroperoxides, peroxy carbonates, azo peroxy compounds and peroxy esters.

Illustrative non-limiting examples of suitable organic peroxides and hydroperoxides include 1,1,3,3-tetramethylbutyl hydroperoxide; t-butyl hydroperoxide; cumene hydroperoxide;

2,5-dimethyl-2,5-di(t-butyl peroxy)hexane; di(t-butyl) peroxide, 2,5-dimethyl-2,5-di(t-butylperoxy)hexyne-3;

benzoyl peroxide; t-butyl cumyl peroxide; di(cumylperoxide); t-amyl hydroperoxide, 2,5-di(hydroperoxy)-2,5-dimethylhexane, 3,3-dimethyl-2-methylhydroperoxybutene-1;2,7-di(hydroperoxy)-2,7-dimethyloctane, diphenylhydroperoxymethane; benzylhydroperoxide;

p-methylhydroperoxytoluene; p-dicumyl dihydroperoxide, 1-isopropyl-3,5-dicumyl dihydroperoxide, cumylmethyl peroxide; triphenyl methyl hydroperoxide and bis-(m-2-hydroperoxy-2-propyl-α-cumyl) peroxide.

Non-limiting examples of suitable peroxy carbonates include o,o-t-butyl-o-isopropylmonoperoxycarbonate and o,o-t-butyl-o-(2-ethylhexyl)monoperoxycarbonate.

A non-limiting example of a suitable azo peroxy compound is t-butylperoxy-4-t-butylazo-4-cyanovalerate.

Non-limiting examples of suitable peroxy esters include α-cumylperoxypivalate, α-cumylperoxy-neoheptanoate and 2,5-dimethyl-2,5-bis(benzoylperoxyhexane).

Preferably, the organic peroxy compound for use in the process described herein is selected from the group comprising t-butyl hydroperoxide, cumene hydroperoxide, p-dicumyl dihydroperoxide, triphenyl methyl hydroperoxide and 2,5-dimethyl-2,5-bis(benzoylperoxyhexane). Most preferably, the organic peroxy compound is selected from one of cumene hydroperoxide, p-dicumyl dihydroperoxide and 2,5-dimethyl-2,5-bis(benzoylperoxyhexane).

The amount of Lewis acid used relative to the amount of peroxy compound is not particularly critical. However, in order to be able to achieve more readily a polymer of desired molecular weight, it is preferred that the mole amount of Lewis acid used is equal to or greater than the mole amount of peroxy compound used. Generally, it is preferred to use from about 2 to about 50, most preferably from about 3 to about 40, moles of Lewis acid per mole of peroxy compound. The concentration of peroxy compound used depends upon the molecular weight desired in the resultant polymer as hereinafter described and is within the range of from about $10^{-4}$ to about $10^{-1}$ moles per mole of monomer except where incremental addition of monomer is used when the ratio of peroxy compound to monomer is still applicable for the initial monomer concentration.

The monomer charge suitable for use in the process of the present invention comprises isobutylene. In a preferred embodiment, the monomer charge in addition to comprising isobutylene, may further comprise a $C_4$ to $C_8$ conjugated diolefin, the amount of such conjugated diolefin being up to about 50 mole percent of the total monomer charge and preferably up to about 10 mole percent of the total monomer charge. In another preferred embodiment, the monomer charge in addition to comprising isobutylene, may further comprise a $C_8$ to $C_{20}$ vinylidene aromatic monomer, in an amount up to about 20 mole percent of the total monomer charge. In yet another preferred embodiment, the monomer charge comprises isobutylene, a $C_4$ to $C_8$ conjugated diolefin and a $C_8$ to $C_{20}$ vinylidene aromatic monomer. The preferred conjugated diolefin is isoprene. The vinylidene aromatic monomer may be substituted or unsubtituted. The preferred vinylidene aromatic monomer is selected from the group comprising styrene, α-methyl styrene and p-methyl styrene.

Block copolymers may also be synthesized in accordance with the process of this invention by the sequential addition of isobutylene and a second monomer selected from the group consisting of conjugated diolefins and vinylidene aromatic monomers. In a preferred embodiment the monomer charge may comprise the sequential addition of isobutylene and a $C_4$ to $C_8$ conjugated diolefin, the amount of such conjugated diolefin being up to about 60 mole percent of the total monomer charge. In another preferred embodiment, the monomer charge may comprise the sequential addition of isobutylene and a $C_8$ to $C_{20}$ vinylidene aromatic monomer, the amount of such vinylidene aromatic monomer being up to about 60 mole percent of the total monomer charge. The preferred conjugated diolefin is isoprene. The vinylidene aromatic monomer may be substituted or unsubstituted. The preferred vinylidene monomer is selected from the group consisting of styrene, p-methylstyrene, 2,4,6-trimethylstyrene and indene.

In another embodiment of the present invention the process may further comprise the addition of an electron donor that has an electron donor number of at least about 22 to no more than about 50 to produce a terminally functional polyisobutylene as hereinafter described having a ratio of weight average molecular weight to number average molecular weight of no more than about 1.6. For the purposes of the present invention the donor number is defined as the molar enthalpy value for the reaction of the electron donor with $SbCl_5$ as a reference acceptor in a $10^{-3}$ M solution of dichloroethane and is a measure of the tendency of the electron donor to share its electrons with the acceptor. Some typical electron donors and their donor acceptor numbers are tabulated by Viktor Gutman in "The Donor-Acceptor Approach to Molecular Interactions", Plenum Press (1978). Preferably, the electron donor for use in the process described herein is selected from the group consisting of dimethylsulfoxide and diethylene glycol dimethyl ether (diglyme). Another electron donor that is preferred for use in the process described herein is tetrahydrothiophene whose electron donor number is not presently known to us. The amount of electron donor used relative to the amount of peroxy compound and relative to the amount of Lewis acid is important. For, if too large an amount of the electron donor is used, the polymerization process will be slowed down markedly or will be terminated far below quantitative conversion, and if too small an amount of the electron donor is used, there be little or no reduction in the undesirable side reactions that give rise to the broad polydispersity. It is preferred that the mole amount of electron donor used is from about $2 \times 10^{-1}$ to about 3 moles per mole of peroxy compound. Furthermore it is desirable that the total of the number of moles of electron donor and number of moles of peroxy compound is less than the number of moles of Lewis acid.

When an electron donor is used in the process of the present invention and the monomer charge comprises the sequential addition of isobutylene and a second monomer selected from the group consisting of conjugated diolefins and vinylidene aromatic monomers, block copolymers which have a ratio of weight average molecular weight to number average molecular weight of no more than about 1.8 are produced. An additional advantage in using an electron donor in said process for producing block copolymers is that there is a considerable reduction in the amount of homopolymer formed relative to that formed when an electron donor is not used.

These aforementioned benefits that result from the use of an electron donor in the process described herein, are most marked when the peroxy compound of said process is selected from the group consisting of organic peroxides and hydroperoxides. Preferably the organic peroxy compound is selected from the group consisting of t-butyl hydroperoxide, cumene hydroperoxide and p-dicumyl dihydroperoxide; most preferably the organic peroxy compound is selected from one of cumene hydroperoxide and p-dicumyl dihydroperoxide.

Somewhat surprisingly it has been found that there is little advantage to be gained in using an electron donor ia the process of the present invention when the peroxy compound of said process is selected from the group consisting of peroxy esters and peroxy carbonates. The terminally functional polymer produced in said process has a ratio of weight average molecular weight to number average molecular weight of no more than about 1.4. Moreover, when the monomer charge of said process comprises the sequential addition of isobutylene and a second monomer selected from the group consisting of conjugated diolefins and vinylidene monomers, block copolymers which have a polydispersity of no more than about 1.8 are produced and there is very little formation of homopolymer. Thus in order that a terminally functional polymer of narrow molecular weight distribution may be produced by the process disclosed herein without resorting to the use of an electron donor, it is preferred that the organic peroxy compound be selected from the group consisting of α-cumylperoxypivalate, α-cumylperoxyneoheptanoate, 2,5-dimethyl-2,5-bis(benzoylperoxyhexane), o,o-t-butyl-o-isopropyl-monoperoxycarbonate and o,o-t-butyl-o-(2-ethylhexyl) monoperoxycarbonate; and it is particularly preferred that the organic peroxy compound be 2,5-dimethyl-2,5-bis(benzoylperoxyhexane).

The process described herein is capable of being conducted at a temperature of from about 0° to about −80° C., preferably from about 0° to about −50° C. Thus a terminally functionalized analogue of butyl rubber may be produced in accordance with the process described herein at temperatures which would substantially reduce the refrigeration costs associated with the operation of a convential commercial butyl rubber plant in which the copolymers are typically produced by polymerization at temperatures as low as −100° C. in the presence of an aluminum chloride catalyst. When the monomer charge of the process described herein comprises the sequential addition of isobutylene and a second monomer selected from the group consisting of conjugated diolefins and vinylidene aliphatic monomers it is preferable that the polymerization process is carried out at a temperature of from about −40° C. to about −80° C. Similarly, when an electron donor is used in the process of the present invention to minimize side reactions, it is preferable that the process is conducted at a temperature of from about −40° C. to about −80° C. no matter whether the monomer charge comprises a single monomer or the sequential addition of monomer.

The process according to the present invention may be conducted in the presence or absence of a diluent. Preferably, the process is conducted in the presence of a diluent. Preferred diluents include (i) $C_1$ to $C_4$ halogenated hydrocarbons, most preferably selected from methyl chloride and methylene dichloride, (ii) $C_5$ to $C_8$ aliphatic hydrocarbons, most preferably selected from the group consisting of pentane, hexane and heptane and (iii) $C_5$ to $C_{10}$ cyclic hydrocarbons, most preferably selected from one of cyclohexane and methylcyclohexane, or mixtures of such halogenated hydrocarbons, or mixtures of such a halogenated hydrocarbon and such an aliphatic hydrocarbon or mixtures of such a halogenated hydrocarbon and such a cyclic hydrocarbon.

The order of addition of the peroxy compound, Lewis acid, diluent (if present) and monomer charge is not particularly critical. In a preferred embodiment, the components are added in the following order: diluent (if present), monomer charge, peroxy compound, and Lewis acid. When the monomer charge of the process disclosed herein comprises the sequential addition of isobutylene and a second monomer selected from the group consisting of conjugated diolefins and vinylidene aromatic monomers it is preferred that the components are added in the following order: diluent (if present), isobutylene charge, peroxy compound, and Lewis acid; the aforesaid second monomer being added only when all the isobutylene has been consumed. When the process disclosed herein further comprises an electron donor it is preferred that the order of addition of the components is as follows: diluent (if present), monomer charge, peroxy compound, electron donor and Lewis acid.

Although not essential, it is preferred to agitate the reaction during the polymerization process, especially if a terminally functional polymer with a relatively narrow molecular weight distribution is desired. Such agitation can be achieved using conventional mixing means and serves to (i) create a homogeneous mixture of reactants and (ii) to dissipate the exothermic heat of reaction.

The terminally functional polymers produced in the present of a diluent according to the process disclosed herein may be recovered by conventional techniques used to recover rubbery polymers. Such techniques include, for the higher molecular weight polymers, contacting the polymer-diluent solution or slurry with copious amounts of hot water thereby flashing off the diluent and any unreacted monomer. The polymer-hot water slurry may then be passed over a screen or filter to recover the polymer which may be passed through a tunnel dryer or drying extruder. In another such technique, especially for polymers produced in the presence of a diluent and having a number average molecular weight ($M_n$) of less than about 30,000 the polymer is recovered by (i) contacting the polymer-diluent solution or slurry with steam or by applying a vacuum to the polymer-diluent solution or slurry to flash off the diluent and any unreacted monomer; (ii) extracting acidic impurities and any remaining high boiling diluents with methanol, and (iii) drying the purified polymer to remove traces of methanol. In yet another technique, especially for low molecular weight polymers, the polymer-diluent solution is contacted with excess water to remove inorganic residues, the solution is dried and the diluent is then removed, as by evaporation.

The products produced according to the process described herein are halogen terminated polymers. While not wishing to be bound by any particular theory we believe that the polymerization mechanism associated with the process disclosed herein involves the opening of the bond between the alkyl group and oxygen of the peroxy compound, subsequently followed by monomer (in this case isobutylene) insertion. Specifically, the reaction most probably occurs according to the following illustrative equation:

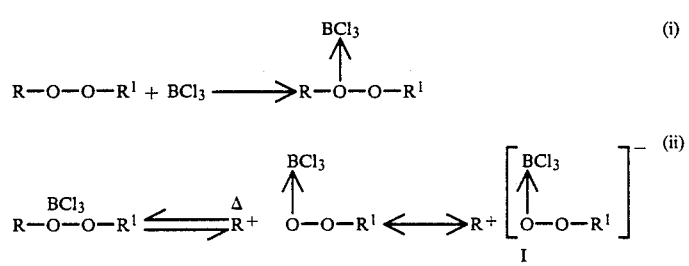

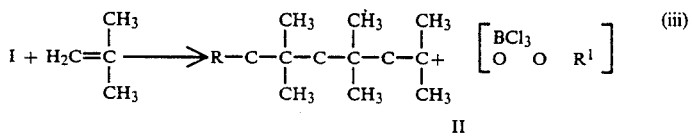

(iii)

wherein R and R¹ may be the same or different, and may be aromatic or aliphatic, or R¹ may be aromatic or aliphatic, or R¹ may be hydrogen. Although the reaction which occurs during the process of the present invention is believed to be an essentially living polymerization, and thus theoretically terminationless, termination of the reaction can be achieved by the addition of a strong nucleophilic compound or simply by raising the process temperature. Termination of the reaction is believed to occur according to the following illustrative equation:

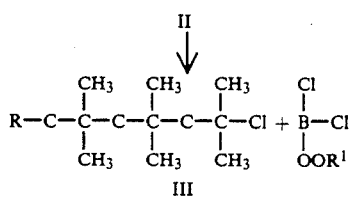

In this specific example, the product III is a chlorine terminated polymer of isobutylene. The by-product $BCl_2(OOR^1)$ is converted to other products and may be removed during the recovery of the polymer.

When the process disclosed herein further comprises an electron donor we believe that the polymerization mechanism associated with the process most probably involves the formation of a complex between the peroxy moiety of the organic peroxy compound, the Lewis acid and the electron donor. The formation of such a complex renders the incipient gegenion (I) more nucleophilic and thus more able to stabilize the propagating carbocation. In this manner the tendency for the growing chain to undergo chain transfer and intramolecular alkylation is reduced and a narrower molecular weight distribution ensues.

We further believe that when the organic peroxy compound used in the process disclosed herein is a peroxy ester or a peroxy carbonate the carbonyl group adjacent to the peroxy moiety in the peroxy ester or in the peroxy carbonate functions as an internal electron donor in that the carbonyl group together with the peroxy moiety form a complex with the Lewis acid and thereby increase the nucleophilicity of the incipient gegenion (I). As a consequence the gegenion so formed is more able to stabilize the propagating carbocation and reduce its tendency to undergo undesirable side reactions.

In the case of copolymerization, for example of isobutylene and isoprene, in accordance with the process disclosed herein, the product would be a halogen, preferably chlorine, terminated polymer in which a small number of reacted isoprene units would be randomly distributed throughout the polyisobutylene backbone.

In the case of the formation of block copolymers by the sequential addition of monomer, for example, isobutylene and styrene, in accordance with the process disclosed herein, the product would be a polymer as illustrated below.

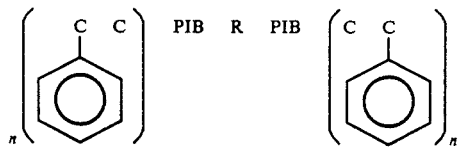

The molecular weight (i.e. the number average molecular weight $M_n$) of the polymer produced in the present process may be varied from as low as about 500 to as high as one million or more. Desirably, $M_n$ is from about 1,000 to about 750,000. The molecular weight may be controlled by the ratio of the initial monomer concentration to the initial peroxy compound concentration. However, once the polymer has initially been produced, it is also possible to add further monomer which will polymerize to yield a higher molecular weight polymer that may be a homopolymer, a random copolymer or a block copolymer.

The present invention will now be illustrated by the following non-limiting examples.

EXAMPLE I

A series of pressure tube experiments were conducted by charging each tube with a specific amount of each of a diluent, initiator and monomer at a temperature of −30° C. The polymerization was initiated by the addition of pure Lewis acid co-catalyst, in this case $TiCl_4$. The polymerization was observed as being extremely rapid; that is, the reaction appeared to be over in a few minutes based on conversion calculations. To ensure that the polymerization was complete, the pressure tubes were left undisturbed for 30 minutes, after which the reaction was quenched by the addition of 5 ml of methanol (MeOH). The resultant polymers were recovered by successive evaporation of volatiles, dissolution in n-hexane, decantation or filtration of inorganic residues such as Lewis acid residues and removal of hexane by evaporation at room temperature. The resultant polymers were characterized by spectroscopic techniques such as IR, ultraviolet and ¹H NMR; osmometry, DSC and GPC techniques were also used.

The polymerization reaction parameters and the physical properties of the resultant polymers are provided in Table 1. The results indicate that t-butyl hydroperoxide (t-BHP) is suitable as an initiator for the production of terminally functional polymers. After analyzing the product by ¹H NMR it was determined that the polymers contained the tert-butyl head group and the tert-chloro end groups as shown by the following formula:

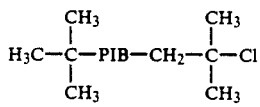

wherein PIB represents the polyisobutylene backbone.

TABLE 1

| Monomer = | isobutylene (IB); 9.1 × 10⁻³ mole |
| Initiator = | t-BHP; 1.28 × 10⁻⁴ mole |
| Lewis acid = | TiCl₄; 1.37 × 10⁻³ mole |
| Diluent = | CH₃Cl; 35 mL |

| Expt. # | Conv. % | Mn | Mw | Mw/Mn |
|---|---|---|---|---|
| 1 | 100 | 3000 | 13300 | 4.4 |
| 2 | 100 | 3100 | 12800 | 4.1 |

EXAMPLE 2

Using the same experimental procedure as outlined in Example 1, another series of experiments was conducted using cumene hydroperoxide (CHP) as the initiator. The polymerization temperature was varied from −30° to −50° C. The polymerization parameters and physical properties of the resultant polymers are provided in Table 2.

TABLE 2

| Expt. # | CH₃Cl mL | Hexane mL | IB mole × 10² | CHP mole × 10⁵ | TiCl₄ mole × 10⁴ | Temp −°C. | Conv % | Mn (GPC) | Mw/Mn |
|---|---|---|---|---|---|---|---|---|---|
| 1 | 50 | — | 7.05 | 178.5 | 45.5 | 45 | 92 | 1900 | 1.8 |
| 2 | 500 | — | 8.9 | 178.5 | 346.5 | 50 | 100 | 2500 | 2.5 |
| 3 | 35 | 15 | 3.6 | 8.5 | 27.35 | 50 | 92 | 22325 | 2.8 |
| 4 | 35 | 15 | 3.6 | 4.2 | 27.35 | 50 | 98 | 37000 | 2.7 |
| 5 | 25 | 25 | 1.85 | 4.2 | 18.2 | 50 | 99 | 29625 | 3.3 |
| 6 | 25 | 25 | 3.65 | 4.2 | 18.2 | 50 | 96 | 42275 | 3.6 |
| 7 | 35 | — | 1.01 | 12.6 | 9.1 | 30 | 82 | 3250 | 1.6 |

The results indicate that cumene hydroperoxide is a suitable initiator for the production of terminally functionalized polymers. The molecular weight of the polymer is approximately given by the expression $$(Mo/Io) \times IB_M$$

where Mo is the initial concentration of monomers, Io is the initial concentration of peroxy compound and $IB_M$ is the molecular weight of the monomer.

Using suitable analytical techniques the product was determined to be the following:

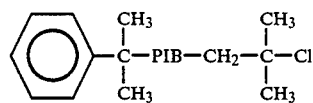

wherein PIB represents the polyisobutylene backbone.

EXAMPLE 3

Using the same experimental procedure as outlined in Example 1, another series of experiments was conducted at −30° C. at various monomer concentrations and in a mixed diluent system. The initiator used was cumene hydroperoxide (CHP). The polymerization conditions and physical properties of the resulting polymers are provided in Table 3.

TABLE 3

| Monomer = | isobutylene (IB); as stated, mole |
| Initiator = | CHP; 4.5 × 10⁻⁵ mole |
| Lewis acid = | TiCl₄ 2.1 × 10⁻⁴ mole |
| Diluent = | CH₃Cl and Hexane mixture; 35 mL: 25 mL CH₃Cl + 10 mL Hexane |

| Expt. | IB, mole | IB conv. | DP$_n$ × 10⁻² | # | g × 10² | % | Mn | Mw/Mn | (calc'd) |
|---|---|---|---|---|---|---|---|---|---|
| | | | | 1 | 0.66 | 1.18 | 100 | 13525 | 3.57 | 2.41 |
| | | | | 2 | 1.05 | 1.87 | 100 | 18600 | 3.70 | 3.32 |
| | | | | 3 | 1.58 | 2.82 | 100 | 40750 | 2.50 | 7.27 |
| | | | | 4 | 2.54 | 4.53 | 100 | 54675 | 2.60 | 9.76 |

The number average degree of polymerization ($DP_n$) was calculated, for each experiment, according to the following equation:

$DP_n$ = Mn of polymer/molecular weight of isobutylene. A plot of $1/DP_n$ vs $1/[M_o]$, which is also known as a "Mayo plot" was constructed using the data in Table 3. The plot yielded a straight line going through the origin which illustrates that the polymerization reaction is essentially a living polymerization.

EXAMPLE 4

To further illustrate the living nature of the polymerization process disclosed herein, a series of polymerization experiments were conducted wherein additional quantities of monomer were added incrementally to reactions which already contained polymer.

Specifically, the experiments were conducted in a series of pressure tubes, each of which were charged, successively, with 35 mL CH₃Cl, cumene hydroperoxide (CHP; 1.0×10⁻⁴ mole) and about 0.5 g isobutylene (IB). The charged tubes were then allowed to thermoequilibrate at a temperature of −30° C. Polymerization was initiated by introducing 5.5×10⁻³ mole of liquid BCl₃ into each of the test tubes. After 45 minutes reaction time, the reaction in the first of the test tubes (Experiment #1) was quenched by the addition of 5 mL of prechilled methanol. An additional amount of about 0.5 g IB was charged into each of the remaining tubes. After 45 minutes, the reaction in the second tube (Experiment #2) was quenched by the addition of methanol. An additional amount of about 0.5 g IB was charged into each of the remaining tubes (i.e. Experiments #3, #4, #5 and #6; 1.17 g IB was inadvertently added to Experiment #3). This type of experimentation is sometimes referred to as "incremental polymerization".

This procedure was repeated until the polymerization reaction in each of the pressure tubes had been quenched. After conventional workup, the amount of polymer and its molecular weight and molecular weight distribution were determined. These data are given in Table 4. A plot of the Mn of the polymer vs the weight of polymer produced yielded a straight line passing through the origin which is indicative of living polymerization having occurred.

TABLE 4

| Expt. # | IB added, g | Mn | Mw/Mn | Polymer formed, g |
|---|---|---|---|---|
| 1 | 0.53 | 5850 | 4.0 | 0.47 |
| 2 | 0.49 + 0.52 | 8650 | 2.7 | 0.85 |
| 3 | 0.54 + 0.41 + 1.17 | 12225 | 2.9 | 1.23 |
| 4 | 0.55 + 0.47 + 0.62 + 0.46 | 12575 | 2.6 | 1.41 |
| 5 | 0.60 + 0.62 + 0.53 + 0.55 + 0.53 | 15150 | 2.4 | 1.71 |
| 6 | 0.54 + 0.55 + 0.47 + 0.48 + 0.61 + 0.59 | 16750 | 25 | 1.70 |

EXAMPLE 5

A series of experiments similar to the one described in Example 4 was conducted using a mixed diluent system and $TiCl_4$ as the co-initiator. The reactions were allowed to proceed for 30 minutes between incremental additions of isobutylene. The reaction parameters and physical properties of the polymers produced are provided in Table 5. A plot of the Mn of the polymer produced vs the weight of polymer produced yielded a straight line passing through the origin which is indicative that the polymerization process conducted in this example is living in nature.

TABLE 5

| Monomer = | isobutylene (IB) |
|---|---|
| Initiator = | CHP; $4.5 \times 10^{-5}$ mole |
| Lewis acid = | $TiCl_4$; $2.1 \times 10^{-4}$ mole |
| Diluent = | $CH_3Cl$ and Hexane mixture; 35 mL: 25 mL $CH_3Cl$ + 10 mL Hexane |

| Expt. # | IB added, g | Mn | Mw/Mn | Polymer formed, g |
|---|---|---|---|---|
| 1 | 1.07 | 12000 | 3.10 | 0.61 |
| 2 | 0.55 + 0.66 | 17950 | 2.98 | 1.01 |
| 3 | 0.48 + 0.60 + 0.60 | 26700 | 2.19 | 1.38 |
| 4 | 0.54 + 0.53 + 0.44 + 0.56 | 28875 | 2.17 | 1.49 |
| 5 | 0.54 + 0.54 + 0.57 + 0.55 + 0.55 | 36950 | 2.16 | 1.77 |

EXAMPLE 6

In this Example, a series of experiments were conducted to produce terminally functionalized copolymers of isobutylene and isoprene. A series of pressure tubes were charged each with 25 mL of $CH_3Cl$ or $CH_2Cl_2$ (as indicated), a specific amount of isobutylene and isoprene, and cumene hydroperoxide (CHP), at a temperature of $-40°$ C. The copolymerizations were initiated by the addition of pure $TiCl_4$ and were allowed to proceed at $-40°$ C. for 40 minutes with agitation of the pressure tubes. The reactions were then quenched by the addition of 5 mL of prechilled methanol. The product polymers were recovered in a manner similar to that described in Example 1. Characterization of the polymers was as hereinbefore described.

The polymerization reaction parameters and the properties of the polymers are provided in Table 6. The results indicate that CHP is suitable for use as an initiator in the production of terminally functional copolymers of isobutylene and isoprene.

TABLE 6

| Monomer = | isobutylene; M1 = $1.8 \times 10^{-2}$ mole = isoprene; M2 = as stated, mole |
|---|---|
| Initiator = | CHP; $2.1 \times 10^{-4}$ mole |
| Lewis acid = | $TiCl_4$; $1.8 \times 10^{-3}$ mole |
| Diluent = | $CH_3Cl$ for Expt. 1, 2 and 3 (25 mL) $CH_2Cl_2$ for Expt. 4, 5, 6 and 7 (25 mL) |

| Expt. # | M2, $\times 10^4$ | M2 in feed mole % | conv. % | Mn | Mw/Mn | Isprene in the polymer mole % |
|---|---|---|---|---|---|---|
| 1 | 10.25 | 5.85 | 94 | 2500 | 2.1 | 4.0 |
| 2 | 20.5 | 11.88 | 94 | 1925 | 2.1 | 7.3 |
| 3 | 41.0 | 22.16 | 100 | 1625 | 2.1 | 13.4 |
| 4 | 4.5 | 2.35 | 92 | 3125 | 2.4 | 1.7 |
| 5 | 10.25 | 5.54 | 95 | 2450 | 2.4 | 3.9 |
| 6 | 20.5 | 11.38 | 95 | 2000 | 2.4 | 6.3 |
| 7 | 41.0 | 22.16 | 100 | 1850 | 2.5 | 10.7 |

EXAMPLE 7

In this example, experiments were conducted to synthesize copolymers of isobutylene, isoprene and a styrenic monomer selected from the group comprising methyl styrene ($\alpha$-MS), p-methyl styrene (p-MS) and styrene (S).

Specifically a reactor was charged with $CH_3Cl$, a specific amount of isobutylene, isoprene, styrenic monomer and CHP, at a temperature of $-80°$ C. The terpolymerization was initiated by the addition of pure $TiCl_4$ and allowed to proceed with vigorous mixing at $-80°$ C. for 30 minutes. The reactions were then quenched by the addition of prechilled methanol. The polymers were recovered in a manner similar to that described in Example 1. Details, including polymer compositions determined by 'H NMR, are given in Table 7.

TABLE 7

| Monomers = | isobutylene (IB); 7.91 mole = isoprene (IP); 2.37 mole = styrenic monomer; 0.79 mole |
|---|---|
| Initiator = | CHP; $5.6 \times 10^{-3}$ mole |
| Lewis acid = | $TiCl_4$; $2.0 \times 10^{-2}$ mole |
| Diluent = | $CH_3Cl$; 2600 g |

| Expt. # | Mole % in the Feed ||||| Conv. % | Mole % in the Product |||||
|---|---|---|---|---|---|---|---|---|---|---|---|
| | IB | IP | $\alpha$-MS | p-MS | S | | IB | IP | $\alpha$-MS | p-MS | S |
| 1 | 77.6 | 14.7 | 7.7 | — | — | 100 | 92.1 | 1.0 | 6.9 | — | — |
| 2 | 77.6 | 14.7 | — | 7.7 | — | 100 | 91.6 | 1.1 | — | 7.7 | — |
| 3 | 77.6 | 14.7 | — | — | 7.7 | 100 | 87.0 | 1.0 | — | — | 12.0 |

EXAMPLE 8

In this example, three polymerizations of isobutylene in a mixed solvent system were conducted using cumene hydroperoxide (CHP) as the initiator and titanium tetrachloride ($TiCl_4$) as the Lewis acid. In one of the experiments, the electron donor, dimethyl sulfoxide, with a donor number of 29.8 was used and in another the electron donor, diglyme was used. The polymerization temperature was $-65°$ C. and the time of polymerization was one hour. The polymerization parameters and physical properties of the resultant polymers are provided in Table 8.

TABLE 8

| Expt. # | CH$_3$Cl mL | Hexane mL | IB Mole × 10$^2$ | CHP Mole × 10$^3$ | TiCl$_4$ Mole × 10$^3$ | E.D. Mole × 10$^3$ | Conv. % | M$_n$ (GPC) | Mw/Mn |
|---|---|---|---|---|---|---|---|---|---|
| 1 | 87.5 | 37.5 | 17.68 | 1.25 | 4.6 | — | 100 | 9500 | 1.8 |
| 2 | 87.5 | 37.5 | 17.68 | 1.25 | 4.6 | DMSO 1.25 | 97 | 9350 | 1.4 |
| 3 | 87.5 | 37.5 | 17.68 | 1.25 | 4.6 | Diglyme 1.25 | 95 | 8568 | 1.3 |

The results indicate that the use of an electron donor in the polymerization process leads to the formation of a polyisobutylene having a narrow molecular weight distribution.

EXAMPLE 9

In this Example, a series of polymerizations of isobutylene were conducted at $-65°$ C. using cumene hydroperoxide (CHP) as the initiator, titanium tetrachloride (TiCl$_4$) as the Lewis acid and varying amounts of the electron donor, dimethyl sulfoxide, with an electron donor number of 29.8. In one experiment, no electron donor was used. The polymerization parameters and physical properties of the resultant polymers are provided in Table 9.

TABLE 9

| Expt. # | CH$_3$Cl mL | Hexane mL | IB Mole × 10$^2$ | CHP Mole × 10$^4$ | TiCl$_4$ Mole × 10$^3$ | DMSO Mole × 10$^4$ | Conv. % | M$_n$ (GPC) | Mw/Mn |
|---|---|---|---|---|---|---|---|---|---|
| 1 | 120 | 80 | 17.86 | 2.5 | 7.34 | 5.0 | 95 | 23,800 | 1.2 |
| 2 | 120 | 80 | 17.86 | 2.5 | 7.34 | 5.0 | 95 | 25,315 | 1.25 |
| 3 | 120 | 80 | 17.86 | 2.5 | 7.34 | 2.5 | 98 | 25,900 | 1.4 |
| 4 | 120 | 80 | 17.86 | 2.5 | 7.34 | — | 100 | 21,438 | 2.0 |

From the results, it can be seen that a polyisobutylene having a narrow molecular weight distribution can be reproducibly formed using the electron donor, dimethyl sulfoxide, with the cumene hydroperoxide/Lewis acid catalyst system.

EXAMPLE 10

In this Example, a series of polymerizations of isobutylene was carried out at $-80°$ C. using cumene hydroperoxide (CHP) as the initiator, titanium tetrachloride (TiCl$_4$) as the Lewis acid, and varying amounts of the electron donor, tetrahydrothiophene. In one experiment, no electron donor was used. The polymerization parameters and physical properties of the resultant polymers are provided in Table 10.

TABLE 10

| Monomer = | Isobutylene; 4.46 × 10$^{-1}$ mole |
|---|---|
| Initiator = | CHP; 5.2 × 10$^{-4}$ mole |
| Lewis acid = | TiCl$_4$; 2.6 × 10$^{-3}$ mole |
| Diluent = | CH$_3$Cl; 250 mL + n-hexane; 100 mL |

| Expt. # | Time Min. | THT mole × 10$^5$ | Conv. % | M (GPC) | Mw/Mn |
|---|---|---|---|---|---|
| 1 | 45 | — | 100 | 47,200 | 3.76 |
| 2 | 45 | 2.5 | 100 | 48,500 | 3.46 |
| 3 | 45 | 8.41 | 100 | 43,900 | 2.33 |
| 4 | 45 | 11.22 | 100 | 39,500 | 2.3 |
| 5 | 60 | 16.83 | 100 | 43,000 | 1.28 |
| 6 | 90 | 22.44 | 100 | 40,100 | 1.36 |
| 7 | 90 | 22.44 | 100 | 35,000 | 1.26 |
| 8 | 90 | 22.44 | 100 | 35,000 | 1.24 |
| 9 | 45 | 44.88 | 23 | — | — |

From the results, it can be seen that the amount of the electron donor used, relative to the amounts of the initiator and the Lewis acid used, is important in narrowing the molecular weight distribution. The results also demonstrate that with an increase in the amount of electron donor used, the rate of polymerization is decreased and this, of course, favours a narrow molecular weight distribution. However it is also apparent that when too great an amount of the electron donor is used the polymerization process is slowed down such an extent that quantitative conversion cannot be achieved.

EXAMPLE 11

In this Example, a series of experiments were conducted to produce block copolymers of isobutylene and styrene, both in the presence and absence of the electron donor, dimethyl sulfoxide. A series of pressure tubes were each charged with a mixture of 120 mL of CH$_3$Cl and 80 mL of n-hexane, specific amounts of isobutylene, cumene hydroperoxide (CHP) and dimethyl sulfoxide at a temperature of $-80°$ C. The polymerizations were initiated by the addition of a specific amount of pure titanium tetrachloride (TiCl$_4$) and were allowed to proceed at $-80°$ C. for 45 minutes with agitation of the pressure tubes. At the end of this time, all the isobutylene had been consumed and the pressure tubes were then each charged with a specific amount of styrene. The copolymerizations were allowed to proceed for a further 60 minutes at $-80°$ C. with agitation and the reactions were then quenched by the addition of 5 ml of prechilled methanol to each tube. The product block copolymers were recovered in a manner similar to that described in Example 1. Characterization of the polymers was as hereinbefore described. The polymerization reaction parameters and the properties of the polymers are provided in Table 11.

TABLE 11

| Monomer = | isobutylene; M1 = 1.79 × 10$^{-1}$ mole = styrene; M2 = as stated, mole |
|---|---|
| Initiator = | CHP; 4.0 × 10$^{-4}$ mole |
| Lewis acid = | TiCl$_4$; 4.6 × 10$^{-3}$ mole |
| Diluent = | CH$_3$Cl; 120 mL + n-hexane; 80 mL |

| Expt. # | M2 Mole × 10$^2$ | E.D.(DMSO) mole × 10$^3$ | M$_n$ (GPC) | Mw Mn | PIB | Mole % St |
|---|---|---|---|---|---|---|
| 1 | 4.81 | — | 19,850 | 2.26 | 95.8 | 4.2 |
| 2 | 4.81 | 0.8 | 34,453 | 1.4 | 78.1 | 21.9 |
| 3 | 4.81 | 0.6 | 38,358 | 1.28 | 79.9 | 20.1 |
| 4 | 4.81 | 0.4 | 33,320 | 1.4 | 79.0 | 21.0 |

DSC measurements on the block copolymer obtained from Experiment #2 showed two glass transition temperatures, the first at −65° C.; indicative of the rubbery polyisobutylene block and the second at 95° C.; indicative of the hard polystyrene block.

From these results it can be seen that the use of the electron donor, dimethyl sulfoxide, in the block copolymerization of isobutylene and styrene, leads to the formation of a block copolymer with a narrower molecular weight distribution formed in addition to the block copolymer.

EXAMPLE 12

In this Example, two experiments were conducted to produce block copolymers of isobutylene and isoprene, one in the presence and one in the absence of the electron donor, dimethyl sulfoxide. The methodology used was similar to that described in Example 11. Characterization of the polymers was as hereinbefore described. The polymerization reaction parameters and the properties of the polymers are provided in Table 12.

TABLE 12

| Monomer = | isobutylene; M1 = 2.68 × $10^{-1}$ mole = isoprene; M2 = as stated, mole |
| Initiator = | CHP; 1.5 × $10^{-3}$ mole |
| Lewis acid = | $TiCl_4$; 9.1 × $10^{-3}$ mole |
| Diluent = | $CH_3Cl$; 218 mL + n-hexane; 202 mL |

| Expt. # | M2 Mole × $10^3$ | E.D. (DMSO) Mole × $10^3$ | $M_n$ (GPC) | Mw/Mn | Mole % PIB | Mole % PIP |
|---|---|---|---|---|---|---|
| 1 | 3.68 | — | 13,327 | 1.6 | 97.5 | 2.5 |
| 2 | 3.68 | 1.0 | 14,032 | 1.19 | 97.6 | 2.4 |

The NMR analysis of the block copolymer obtained from Experiment 2 has shown that some of the isoprene in the polyisoprene block has lost its unsaturation and formed cyclized polyisoprene. This is not unexpected in view of the excess Lewis acid present.

The results demonstrate that the use of the electron donor, dimethyl sulfoxide in the block copolymerization of isobutylene and isoprene gives rise to a block copolymer with a narrower molecular weight distribution.

EXAMPLE 13

In this Example, a series of polymerizations of isobutylene was carried out using the initiator 2,5-dimethyl-2,5-bis(benzoyl peroxyhexane) (Luperox 118)®and the Lewis acid titanium tetrachloride ($TiCl_4$) and varying the solvent and the temperature. The polymerization reaction parameters and the properties of the polymers are provided in Table 13.

TABLE 13

| Expt. # | $CH_3Cl$ mL | Hexane mL | IB mole | Luperox ® mole × $10^3$ | $TiCl_4$ mole × $10^2$ | Temp −°C. | $M_n$ | Mw/Mn | Conv. % |
|---|---|---|---|---|---|---|---|---|---|
| 1 | 600 | 400 | 1.0 | 1.0 | 1.82 | 70 | 54,359 | 1.13 | 95 |
| 2 | 500 | 334 | 0.9 | 1.1 | 1.82 | 75 | 47,115 | 1.15 | 100 |
| 3 | 700 | 300 | 1.0 | 1.12 | 1.82 | 80 | 43,525 | 1.20 | 90 |
| 4 | 500 | 345 | 1.0 | 1.18 | 1.82 | 80 | 49,500 | 1.08 | 95 |
| 5 | 500 | 350 | 0.9 | 1.1 | 1.36 | 65 | 43,877 | 1.21 | 90 |

From the results, it can be seen that by using 2,5-dimethyl-2,5-bis(benzoyl peroxyhexane)/Lewis acid catalyst system for the polymerization of isobutylene, it is possible to produce a polyisobutylene for which the ratio of weight average molecular weight to number average molecular weight approaches 1. Furthermore as demonstrated by Experiment #1, the molecular weight of the polymer is approximately given by the expression $$(M_o/I_o) \times IB_m$$

where $M_o$ is the initial concentration of monomer; $I_o$ is the initial concentration of the peroxy ester and $IB_m$ is the molecular weight of the monomer, thereby indicating that the polymerization of isobutylene is a truly living process.

EXAMPLE 14

In this Example, a series of experiments was conducted to produce copolymers of isobutylene and styrene using the initiator 2,5-dimethyl-2,5-bis(benzoylperoxyhexane) (Luperox 118)® and the Lewis acid titanium tetrachloride ($TiCl_4$). A series of two-necked round bottom flasks, each equipped with a mechanical stirrer and a rubber septum, were each charged with diluent (as indicated), 15 grams of isobutylene and a specific amount of Luperox 118®, at the indicated temperatures. Polymerization of the isobutylene was initiated by the addition of the specified amount of pure $TiCl_4$. Incremental addition of 5 gram aliquots of isobutylene were then made every 10 minutes to each flask, until all the isobutylene had been consumed. Specific amounts of styrene were then added to the living polyisobutylene dications in each flask and the polymerizations were allowed to proceed at the indicated temperatures for 120 minutes. The reactions were then quenched by the addition of 5 ml of prechilled methanol to each flask. The product block copolymers were recovered in a manner similiar to that described in Example 1 and were then extracted with ethyl acetate in order to remove any homopolystyrene formed. The polymerization reaction parameters and the properties of the polymers are provided in Table 14.

TABLE 14

| Initiator = | Luperox 118 ®; 2.08 × $10^{-3}$ mole (Experment 1) = Luperox 118 ®; 2.07 × $10^{-3}$ mole (Experiment 2) = Luperox 118 ®; 9.0 × $10^{-4}$ mole (Experment 3) |
| Lewis acid = | $TiCl_4$; 2.3 × $10^{-2}$ mole |
| Diluent = | $CH_3Cl$; 436 mL + n-hexane; 150 mL (Expt. 1 & 2) = $CH_3Cl$; 196 mL + n-hexane; 160 mL (Expt. 3) |

| Expt. # | IB mole | Styrene mole × $10^{-1}$ | Temp. °C. | Mn (GPC) | $M_w/M_n$ | Mole % PIB | Mole % PSt |
|---|---|---|---|---|---|---|---|
| 1 | 1.20 | 3.15 | −80° | 47,282 | 1.4 | 80.0 | 19.4 |
| 2 | 1.16 | 3.15 | −70° | 37,378 | 1.5 | 83.0 | 17.0 |
| 3 | 0.48 | 2.35 | −70° | 50,433 | 1.5 | 75.0 | 25.0 |

EXAMPLE 15

In this Example, two experiments were carried out to produce block copolymers of isobutylene and isoprene using the initiator 2,5-dimethyl-2,5-bis(benzoylperoxyhexane)(Luperox 118)® and the Lewis acid titanium tetrachloride (TiCl$_4$). Experiment 1 was conducted using the methodology described in Example 14. Experiment 2 was carried out by charging a two-necked round bottom flask equipped with a mechanical stirrer and rubber septum with the specified amounts of the diluent, isobutylene and Luperox 118 ® at −65° C. Polymerization of the isobutylene was initiated by the addition of the specified amount of pure TiCl$_4$. After 120 minutes when all the isobutylene had been consumed, the specified amount of isoprene was added and polymerization was allowed to proceed for a further 60 minutes. The reaction was then quenched by the addition of 5 ml of prechilled methanol. The product block copolymer was then recovered in a manner similar to that described in Example 1.

The polymerization parameters and the properties of the polymers obtained in the two experiments are provided in Table 15.

TABLE 15

| Initiator = | Luperox 118 ®; 0.98 mole (Experiment 1) = Luperox 118 ®; 1.5 mole (Experiment 2) |
| Lewis acid = | TiCl$_4$; 2.3 × 10$^{-2}$ mole |
| Diluent = | CH$_3$Cl; 218 mL + n-hexane; 150 mL (Expt. 1) = CH$_3$Cl; 435 mL + n-hexane; 160 mL (Expt. 2) |

| Expt. # | IB mole | Isoprene mole | Temp. °C. | Mn | M$_w$/M$_n$ | Mole % IB | Mole % PIP |
|---|---|---|---|---|---|---|---|
| 1 | 0.71 | 0.2 | −70 | 52,713 | 1.55 | 98.5 | 1.5 |
| 2 | 1.16 | 0.3 | −65 | 32,000 | 1.6 | 94.7 | 5.3 |

Analysis of the block copolymers by GPC has demonstrated that the block copolymers produced by the "incremental monomer addition" technique or by the "all monomer in" technique have a narrow molecular weight distribution that is monomodal.

EXAMPLE 16

In this Example, one experiment was carried out to produce a block copolymer of isobutylene and styrene and a second experiment was carried out to produce a block copolymer of isobutylene and 2,4,6-trimethylstyrene. In both experiments the initiator used was 2,5-dimethyl-2,5-bis(benzoyl peroxy hexane) (Luperox 118) ®, the Lewis acid was titanium tetrachloride (TiCl$_4$) and the polymerization temperature was −80° C. The methodology used was similar to that described in Example 11.

TABLE 16

| Initiator = | Luperox 118 ®; 2.6 × 10$^{-2}$ mole (Experiment 1) = Luperox 118 ®; 5.2 × 10$^{-2}$ mole (Experiment 2) |
| Diluent = | CH$_3$Cl; 436 mL + n-hexane; 150 mL (Expt. 1) = CH$_3$Cl; 218 mL + n-hexane; 202 mL (Expt. 2) |

| Expt. # | IB mole × 10 | Styrene mole × 10 | TiCl$_4$ × 10$^2$ | Mn | M$_w$/M$_n$ | Mole % PIB | Mole % PSt |
|---|---|---|---|---|---|---|---|
| 1 | 7.14 | 3.50 | 2.5 | 38,288 | 1.7 | 70 | 30 |
| 2 | 2.68 | 0.31 (2,4,6-trimethyl) | 1.5 | 32,850 | 1.32 | 93.9 | 6.1 |

What is claimed is:

1. A living cationic polymerization process for producing a terminally functional polymer which comprises introducing a monomer charge, a Lewis acid and an organic peroxy compound selected from the group consisting of organic peroxide, organic hydroperoxide, peroxy carbonate, azo peroxy compound and peroxy esters into a suitable reaction vessel and polymerizing the monomer charge at a temperature of from about 0 degrees to about −80 degrees centigrade to form said terminally functional polymer, wherein said monomer charge comprises the sequential addition of isobutylene and a second monomer selected from the group consisting of conjugated diolefins and vinylidene aromatic monomers and said organic peroxy compound is charged in an amount of from 10$^{-4}$ to about 10$^{-1}$ moles per mole of said isobutylene.

2. The process of claim 1, wherein said monomer charge is polymerized at a temperature of from about −40° to about −80° C.

3. The process of claim 1, wherein said organic peroxy compound is selected from the group consisting of peroxy esters and peroxy carbonates.

4. The process of claim 3, wherein said organic peroxy compound is a peroxy ester selected from the group consisting of α-cumylperoxypivalate, α-cumylperoxyneoheptanoate and 2,5-dimethyl-2,5-bis(benzoylperoxyhexane).

5. The process of claim 3, wherein said organic peroxy compound is a peroxy carbonate selected from the group consisting of o,o-t-butyl-o-isopropyl-monoperoxycarbonate and o,o-t-butyl-o-(2-ethylhexyl)-monoperoxycarbonate.

6. The process of claim 3, wherein the second monomer charge comprises a C$_4$ to C$_8$ conjugated diolefin in an amount of up to 60 mole percent of the total monomer charge.

7. The process of claim 6, wherein said conjugated diolefin is isoprene.

8. The process of claim 3, wherein the second monomer charge comprises a C$_8$ to C$_{20}$ vinylidene aromatic monomer in an amount of up to about 60 mole percent of the total monomer charge.

9. The process of claim 8, wherein said vinylidene aromatic monomer is selected from the group consisting of styrene, p-methylstyrene, 2,4,6-trimethylstyrene and indene.

10. The process of claim 3, wherein said Lewis acid is selected from the group consisting of BCl$_3$, BF$_3$, AlCl$_3$, SnCl$_4$, TiCl$_4$, SbF$_5$, SeCl$_3$, ZnCl$_2$, FeCl$_3$ and VCl$_4$.

11. The process of claim 10, wherein said Lewis acid is selected from BCl$_3$ and TiCl$_4$.

12. The process of claim 3, conducted in the presence of a diluent.

13. The process of claim 12 wherein said diluent is selected from the group consisting of C$_1$ to C$_4$ halogenated hydrocarbons, C$_5$ to C$_8$ aliphatic hydrocarbons, C$_5$ to C$_{10}$ cyclic hydrocarbons, mixtures of said halogenated hydrocarbons, mixtures of one of said halogenated hydrocarbons and one of said aliphatic hydrocarbons and mixtures of one of said halogenated hydrocarbons and one of said cyclic hydrocarbons.

14. The process of claim 13, wherein said diluent is selected from methyl chloride, methylene chloride, hexane and cyclohexane and mixtures thereof.

15. The process of claim 3, wherein said monomer charge comprises the sequential addition of isobutylene and a second monomer selected from the group consisting of isoprene, styrene, p-methylstyrene 2,4,6-trimethylstyrene and indene the amount of said second monomer charge being up to 60 mole percent of the total monomer charge, said Lewis acid is one of BCl$_3$ and TiCl$_4$, said organic peroxy compound is a peroxy ester selected from the group consisting of α-cumylperoxy pivalate, α-cumylperoxy-neoheptanoate and 2,5-dimethyl-2,5-bis (benzoylperoxyhexane), the amount of said Lewis acid being from about 3 to about 40 moles per mole of said peroxy compound and a diluent is present selected from the group consisting of methyl chloride, methylene chloride, hexane, cyclohexane or mixtures thereof.

16. A living cationic polymerization process for producing a terminally functional polymer which comprises introducing a monomer charge, a Lewis acid, a peroxide or a hydroperoxide selected from the group consisting of 1,1,3,3-tetramethylbutyl hydroperoxide, t-butyl hydroperoxide, cumene hydroperoxide, 2,5-dimethyl-2,5-di-(t-butylperoxy)hexane, di(t-butyl) peroxide, t-butyl cumyl peroxide, di(cumyl) peroxide), t-amyl hydroperoxide, 2,5-di(hydroperoxy)-2,5-dimethyl-hexane, 3,3-dimethyl-2-methylhydroperoxybutene-1,2,7-di-(hydroperoxy)-2,7-dimethyloctane, diphenylhydroperoxymethane, benzyl hydroperoxide, p-methylhydroperoxytoluene, p-dicumyl dihydroperoxide, 1-isopropyl-3,5-dicumyl dihydroperoxide, cumylmethyl peroxide, triphenyl methyl hydroperoxide and bis-(m-2-hydroperoxy-2-propyl-alpha-cumyl) peroxide and an electron doner into a suitable reaction vessel and polymerizing the monomer charge at a temperature of from 0 degrees to about −80 degrees centigrade to form said terminally functional polymer, wherein said monomer charge comprises isobutylene, said peroxide or hydroperoxide is charged in an amount of from $10^{-4}$ to about $10^{-1}$ moles per mole of said isobutylene, and said electron donor is selected from the group consisting of electron donors having an electron donor number of from about 22 to about 50 and tetrahydrothiophene whose electron donor number is not presently known to us, the amount of said donor being from about $10^{-4}$ to about $10^{-1}$ moles per mole of isobutylene.

17. The process of claim 16, wherein said monomer charge is polymerized at a temperature of from about −40° to about −80° C.

18. The process of claim 16, wherein said organic peroxy compound is selected from the group consisting of t-butyl hydroperoxide, cumene hydroperoxide, p-dicumyl dihydroperoxide and triphenyl methyl hydroperoxide.

19. The process of claim 18, wherein said organic peroxy compound is selected from cumene hydroperoxide and p-dicumyl dihydroperoxide.

20. The process of claim 16, wherein said Lewis acid is selected from the group consisting of $BCl_3$, $BF_3$, $AlCl_3$, $SnCl_4$, $TiCl_4$, $SbF_5$, $SeCl_3$, $ZnCl_2$, $FeCl_3$ and $VCl_4$.

21. The process of claim 20, wherein said Lewis acid is selected from the group consisting of $BCl_3$ and $TiCl_4$.

22. The process of claim 16, conducted in the presence of a diluent.

23. The process of claim 22 wherein said diluent is selected from the group consisting of $C_1$ to $C_4$ halogenated hydrocarbons, $C_5$ to $C_8$ aliphatic hydrocarbons, $C_5$ to $C_{10}$ cyclic hydrocarbons, mixtures of said halogenated hydrocarbons, mixtures of one of said halogenated hydrocarbons and one of said aliphatic hydrocarbons and mixtures of one of said halogenated hydrocarbons and one of said cyclic hydrocarbons.

24. The process of claim 23, wherein said diluent is selected from methyl chloride, methylene chloride, hexane and cyclohexane and mixtures thereof.

25. The process of claim 16, wherein said Lewis acid is one of $BCl_3$ and $TiCl_4$, said organic peroxy compound is one of cumene hydroperoxide and p-dicumyl dihydroperoxide, said electron donor is one of dimethyl sulfoxide, diethylene glycol dimethyl ether (diglyme) and tetrahydrothiophene, the amount of said Lewis acid being from about 3 to about 40 moles per mole of said peroxy compound, the amount of said electron donor being from about $2 \times 10^{-1}$ about 3 moles per mole of said peroxy compound and a diluent is present selected from the group consisting of methyl chloride, methylene chloride, hexane, cyclohexane or mixtures thereof.

26. The process of claim 16, wherein said monomer charge comprises the sequential addition of isobutylene and a second monomer selected from the group consisting of conjugated diolefins and vinylidene aromatic monomers.

27. The process of claim 26, wherein said monomer charge is polymerized at a temperature of from about −40° to about −80° C.

28. The process of claim 26, wherein the second monomer charge comprises a $C_4$ to $C_8$ conjugated diolefin in an amount of up to 60 mole percent of the total monomer charge.

29. The process of claim 28, wherein said conjugated diolefin is isoprene.

30. The process of claim 26, wherein the second monomer charge comprises a $C_8$ to $C_{20}$ vinylidene aromatic monomer in an amount of up to about 60 mole percent of the total monomer charge.

31. The process of claim 30, wherein said vinylidene aromatic monomer is selected from the group consisting of styrene, p-methylstyrene, 2,4,6-trimethylstyrene and indene.

32. The process of claim 26, wherein said Lewis acid is selected from the group consisting of $BCl_3$, $AlCl_3$, $SnCl_4$, $TiCl_4$, $SbF_5$, $SeCl_3$, $ZnCl_2$, $FeCl_3$ and $VCl_4$.

33. The process of claim 32, wherein said Lewis acid is selected from $BCl_3$ and $TiCl_4$.

34. The process of claim 26 conducted in the presence of a diluent.

35. The process of claim 34 wherein said diluent is selected from the group consisting of $C_1$ to $C_4$ halogenated hydrocarbons, $C_5$ to $C_8$ aliphatic hydrocarbons, $C_5$ to $C_{10}$ cyclic hydrocarbons, mixtures of said halogenated hydrocarbons, mixtures of one of said halogenated hydrocarbons and one of said aliphatic hydrocarbons and mixtures of one of said halogenated hydrocarbons and one of said cyclic hydrocarbons.

36. The process of claim 35, wherein said diluent is selected from methyl chloride, methylene chloride, hexane and cyclohexane and mixtures thereof.

37. The process of claim 26, wherein said monomer charge comprises the sequential addition of isobutylene and a second monomer selected from the group consisting of isoprene, styrene, p-methylstyrene, 2,4,6-trimethylstyrene and indene, the amount of said second monomer charge being up to 60 mole percent of the total monomer charge, said Lewis acid is one of $BCl_3$ and $TiCl_4$, said organic peroxy compound is one of cumene hydroperoxide and p-dicumyl dihydroperoxide, said electron donor is one of dimethylsulfoxide, diethylene glycol dimethyl ether (diglyme) and tetrahydrothiophene, the amount of said Lewis acid being from about 3 to about 40 moles per mole of said peroxy compound, the amount of said electron donor being from about $2 \times 10^{-1}$ to about 3 moles per mole of said peroxy compound and a diluent is present selected from the group consisting of methyl chloride, methylene.

* * * * *

UNITED STATES PATENT AND TRADEMARK OFFICE
CERTIFICATE OF CORRECTION

PATENT NO. : 4,943,616
DATED : July 24, 1990
INVENTOR(S) : Munmaya K. Mishra et al It is certified that error appears in the above-identified patent and that said Letters Patent is hereby corrected as shown below:

Title Page, lines 17 and 19 of the Abstract, "door" should be --donor--

Column 19, line 8, after "Lewis acid", "a" should be cancelled and the following inserted --an organic peroxy compound selected from the group consisting of organic peroxide, organic hydroperoxide, peroxy carbonate, azo peroxy compound and peroxy esters, said--

Column 19, line 16, a space should appear between "1," and "2,"

Column 19, line 22, "doner" should be --donor--

Column 19, lines 26 and 27, "peroxide or hydroperoxide" should be --organic peroxy compound--

Signed and Sealed this

Seventeenth Day of November, 1992

Attest:

DOUGLAS B. COMER

Attesting Officer     Acting Commissioner of Patents and Trademarks